United States Patent
Pawliczek et al.

(10) Patent No.: US 11,926,419 B2
(45) Date of Patent: Mar. 12, 2024

(54) AIRCRAFT LIGHT AND AIRCRAFT COMPRISING AT LEAST ONE AIR-CRAFT LIGHT

(71) Applicant: Goodrich Lighting Systems Gmbh & Co. KG, Lippstadt (DE)

(72) Inventors: Carsten Pawliczek, Lippstadt (DE); Andre Hessling-Von Heimendahl, Koblenz (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/166,174

(22) Filed: Feb. 8, 2023

(65) Prior Publication Data
US 2023/0249827 A1 Aug. 10, 2023

(30) Foreign Application Priority Data
Feb. 8, 2022 (EP) .................. 22155717.6

(51) Int. Cl.
*B64D 11/00* (2006.01)
*F21V 19/00* (2006.01)
(Continued)

(52) U.S. Cl.
CPC ............ *B64D 11/00* (2013.01); *F21V 19/003* (2013.01); *B64D 2011/0038* (2013.01);
(Continued)

(58) Field of Classification Search
CPC ... F21V 19/0045; F21V 19/003; B64D 11/00; B64D 2011/0038; B64D 2203/00; F21Y 2115/10; F21W 2106/00
See application file for complete search history.

(56) References Cited

U.S. PATENT DOCUMENTS 9,969,496 B2 * 5/2018 Ohta ................... B64D 11/00
10,066,813 B2 9/2018 Poorter et al.
(Continued)

FOREIGN PATENT DOCUMENTS

CN 201571290 U 9/2010
DE 202015106042 U1 2/2017
(Continued)

OTHER PUBLICATIONS

Abstract for CN201571290 (U), Published: Sep. 1, 2010, 1 page.
(Continued)

*Primary Examiner* — Gerald J Sufleta, II
(74) *Attorney, Agent, or Firm* — CANTOR COLBURN LLP (57) ABSTRACT

An aircraft light includes a support board and a supporting profile. The support board supports at least one electric light source, in particular at least one LED. The support board has two lateral edges, which extend in a longitudinal direction of the support board and which are spaced apart from each other in a transverse direction (T) of the support board. The supporting profile comprises a receiving space for receiving and supporting the support board. The receiving space is defined by a base, extending in a longitudinal direction (L) of the supporting profile and in a transverse direction (T) of the supporting profile, and two opposing side walls protruding from the base. The supporting profile further comprises two undercut sections, forming opposing slots in the two opposing side walls that are dimensioned for accommodating a lateral edge of the support board, respectively.

20 Claims, 7 Drawing Sheets

(51) Int. Cl.
 *F21W 106/00* (2018.01)
 *F21W 107/30* (2018.01)
 *F21Y 115/10* (2016.01)

(52) U.S. Cl.
 CPC ..... *B64D 2203/00* (2013.01); *F21W 2106/00* (2018.01); *F21W 2107/30* (2018.01); *F21Y 2115/10* (2016.08)

(56) References Cited

U.S. PATENT DOCUMENTS

| | | | |
|---|---|---|---|
| 10,724,719 B1* | 7/2020 | Heredia | F21V 5/02 |
| 2010/0328947 A1 | 12/2010 | Chang et al. | |
| 2012/0002427 A1* | 1/2012 | Moon | F21V 21/35 |
| | | | 362/382 |
| 2012/0218777 A1 | 8/2012 | Que et al. | |
| 2013/0010473 A1 | 1/2013 | Dellian et al. | |
| 2014/0334151 A1 | 11/2014 | Kigele | |
| 2016/0238215 A1 | 8/2016 | Ohta et al. | |
| 2022/0097853 A1* | 3/2022 | Jha | B60Q 3/44 |

FOREIGN PATENT DOCUMENTS

| | | |
|---|---|---|
| DE | 102016221130 A1 | 4/2018 |
| WO | 2018077555 A1 | 5/2018 |

OTHER PUBLICATIONS

Abstract for DE202015106042 (U1), Published: Feb. 14, 2017, 1 page.
Extended European Search Report for Application No. 22155717.6, dated Jul. 27, 2022, 8 pages.

\* cited by examiner

AIRCRAFT LIGHT AND AIRCRAFT COMPRISING AT LEAST ONE AIR-CRAFT LIGHT

CROSS-REFERENCE TO RELATED APPLICATIONS

This application claims priority to European Patent Application No. 22155717.6 filed Feb. 8, 2022, the entire contents of which is incorporated herein by reference.

TECHNICAL FIELD

The present invention is in the field of aircraft lights. The present invention is in particular related to aircraft lights, which may be employed as interior aircraft lights or as exterior aircraft lights in different types of aircraft.

BACKGROUND

Passenger aircraft, such as commercial air planes, are usually equipped with a plurality of lights, including interior aircraft lights, which are installed within a passenger cabin of the aircraft for illuminating the passenger cabin, in particular for illuminating specific areas within the passenger cabin, such as lavatories, galleys, or aisles. Aircraft may further include exterior lights, which are configured for illuminating portions of the exterior of the aircraft, such as portions of a wing, of a stabilizer and/or of the fuselage of the aircraft, in particular parts of the aircraft, on which logos are shown.

The aircraft light may extend in a longitudinal direction, for example along an aisle within the passenger cabin, for providing the desired illumination.

It would be beneficial to provide an aircraft light, which is small, in order to fit into confined spaces, and which may be produced easily and at lows costs. It would further be beneficial for the aircraft light to allow for an efficient dissipation of heat, which is generated when operating the aircraft light.

SUMMARY

Exemplary embodiments of the invention include an aircraft light, which comprises at least one support board and at least one supporting profile. The at least one support board extends in a longitudinal direction and in a transverse direction, which is orthogonal to the longitudinal direction. The at least one support board has two lateral edges, which extend in the longitudinal direction and which are spaced apart from each other in the transverse direction. The at least one support board supports at least one electric light source, in particular at least one LED.

Optionally, the at least one support board may support a plurality of light sources and/or electric circuitry including electric elements other than light sources, such as an electric driver circuit for driving the at least one light source, an electric control circuit for controlling the operation of the at least one light source, and/or one or more sensors, which may include at least one light sensor and/or at least one temperature sensor, in order to allow for operating the at least one light source depending on the light intensity and/or temperature values detected by said sensors.

The at least one supporting profile comprises a receiving space for receiving and supporting the support board. The receiving space is defined by a base and two opposing side walls protruding from the base.

The base extends in a longitudinal direction of the supporting profile and in a transverse direction of the supporting profile. The transverse direction is oriented orthogonal to the longitudinal direction.

The at least one supporting profile further comprises two undercut sections. The two undercut sections form opposing slots in the two opposing side walls. In particular, each undercut section may form at least one slot in one of the two opposing side walls, respectively. Each slot is open towards the receiving space and is dimensioned for accommodating one of the lateral edges of the support board, respectively.

Each slot may extend over the whole length of the supporting profile along the longitudinal direction. Alternatively, at least one of the slots may be interrupted, so that the slot consists of at least two slot sections. In such a configuration, two or more slot sections may be formed next to each other within a side wall of the supporting profile. Each slot section may extend over a limited length, which is shorter than the complete length of the supporting profile, in the longitudinal direction, and an intermediate section, in which no slot is formed, may be formed in between two adjacent slot sections.

At least one of the two lateral edges of the support board comprises at least one spring element for elastically fixing the support board within the receiving space, with the two lateral edges of the support board being arranged in two opposing slots.

An aircraft light according to an exemplary embodiment of the invention may allow for an easy and secure installation and fixation of the support board in the supporting profile. It may in particular allow for securely fixing the support board within the supporting profile, without employing additional fixing means, such as screws, clamps or an adhesive.

Instead of employing such additional fixing means, a support board of an aircraft light in accordance with exemplary embodiments of the present invention is provided with spring elements at its lateral edges. These spring elements may be machined directly into the support board. In such a configuration, the fixing means do not add additional elements to the aircraft light. In consequence, the aircraft light may be assembled in a fast and easy manner.

Avoiding additional fixing means for fixing the support board may contribute to reducing the costs of the aircraft light. Employing spring elements according to exemplary embodiments of the present invention may also improve the alignment of the support board within the receiving space and may enhance the thermal conductivity between the support board and the supporting profile. This may allow for an efficient dissipation of the heat, which is generated when the at least one light source is operated.

The at least one spring element of the support board is elastically compressed for installing the support board within the receiving space of the supporting profile. The at least one spring element is at least partially decompressed after the support board has been arranged in its final position within the receiving space.

The elasticity of the at least one spring element urges the at least one spring element against a portion of the profile, in particular against a wall of one of the slots. This may fix and center the support board within the receiving space. A reliable centering of the support board may contribute a high quality light output of the aircraft light. Further, fixing the support board in a well-defined position may provide for good thermal conductivity for dissipating heat, which is generated when the at least one light source is operated, from the support board to the supporting profile. As the at least one spring element contacts a portion of the supporting profile, heat may be transferred from the support board to the supporting profile via the at least one spring element, too.

In an embodiment, the base of the supporting profile comprises a support surface, which defines a base side of the receiving space and which is configured for contacting and supporting at least a portion of the support board, in particular a substantial portion of the support board, when the support board is arranged in a flat orientation within the receiving space, i.e. in an orientation, in which the support board extends parallel to the support surface, with the two lateral edges of the support board introduced in two opposing slots formed by the undercut sections.

Such a support surface may provide an area of contact, preferably a relatively large area of contact, between the support board and the base of the supporting profile. A large area of contact may allow for a relatively large transfer of thermal energy from the support surface to the base. This may allow for efficiently dissipating heat, which is generated by operating the at least one light source, from the support board via the supporting profile.

In an embodiment, the side walls of the supporting profile extend in a direction, which is oriented basically orthogonal to the base surface. Such a configuration results in a receiving space having a basically rectangular cross-section. Such a receiving space is well suited for receiving support boards having a basically rectangular shape.

In an embodiment, the base surface has a basically rectangular shape. The combination of a base surface, having a basically rectangular shape, with side walls, which are oriented basically orthogonal to the base surface, results in a basically cuboid shape of the receiving space. A receiving space with a basically cuboid shape is well-suited for receiving rectangular support boards as they are often employed in aircraft lights.

In an embodiment, the distance in the transverse direction between the two side walls is between 5 mm and 50 mm, in particular between 10 mm and 30 mm, more particularly between 14 mm and 18 mm. In an embodiment, the extension of each undercut section in the transverse direction is between 1 mm and 5 mm, in particular between 1 mm and 3 mm, more particularly between 1.5 mm and 2.0 mm. Such dimensions have been found to be well suited for aircraft lights, which may be installed within a passenger cabin or at the exterior of an aircraft.

In an embodiment, at least one of the undercut sections comprises an inclined portion for clamping the support board towards the base. In particular, each of the two undercut sections may comprise a respective inclined portion for clamping the support board towards the base. The inclined portion may be a surface of the undercut section that is opposed to the base of the supporting profile. In particular, the inclined portion may be a surface that extends laterally outward from the respective side wall and that is inclined with respect to the transverse direction of the supporting profile. The inclined portion may have an angle of between 5° and 30°, in particular of between 10° and 20°, further in particular of about 15°, with respect to the transverse direction of the supporting profile. The inclined portion may have an angle of between 60° and 85°, in particular of between 70° and 80°, further in particular of about 75°, with respect to the side wall. In a supporting profile, in which at least one of the undercut sections comprises such inclined portion, the support board may be clamped and thereby fixed between the inclined portion(s) and the base. An undercut section, which comprises an inclined portion, may therefore allow to securely fix the support board within the receiving space by clamping the support board towards the base.

In an embodiment, at least one of the undercut sections comprises a groove in the base. The groove may in particular be formed with respect to the support surface of the receiving space. Each of the two undercut sections may comprise a groove formed within the base. The groove(s) within the base may help in inserting the support board into the undercut section(s) during assembly of the aircraft light.

The groove may in particular be formed in a portion of the base, which defines the receiving space. Such a groove may ease introducing one of the lateral edges of the support board into one of the slots, when the support board is arranged within the receiving space in a pre-assembled orientation, in which the support board is not oriented parallel to the support surface, but in which the support board is arranged in an inclined orientation with respect to the base.

In an embodiment, the groove has an angled surface, which is inclined at an angle of between 30° and 90°, in particular at an angle of between 30°and 60°, with respect to the base, in particular with respect to the support surface of the receiving space formed in the base. The angled surface may be directly adjacent to the support surface.

In an embodiment, the at least one spring element includes an elastic finger, which extends from a lateral edge of the support board. In embodiments, in which the support board comprises a plurality of spring elements, one of the plurality of spring elements, a subset of the plurality of spring elements, or all of the plurality of spring elements may comprise such an elastic finger.

The elastic finger may have a first end, which is arranged in some distance from the support board in the transverse direction, a second end, which is attached to or formed integrally with the support board, and a middle portion extending between the first end and the second end. The first end is elastically movable towards the support board in the transverse direction, and it moves back outwards, i.e. away from the support board, along the transverse direction, when no force is applied to the elastic finger. An elastic finger provides a spring element which may interact with one of the undercut sections for securely fixing the support board within the receiving space and which may be produced easily, for example by machining the elastic finger out of the support board.

In an embodiment, the at least one spring element includes an opening, in particular a slit, which is formed close to one of the lateral edges of the support board. In other words, the opening may be formed proximate to or adjacent to one of the lateral edges of the support board.

The at least one spring element further includes an elastic bar. The elastic bar defines an outer rim portion of the opening and simultaneously forms a portion of a lateral edge of the support board. In other words, the elastic bar is formed by the portion of the support board, which is between the opening and the lateral edge of the support board.

The elastic bar may be elastically movable inside, i.e. towards a central portion of the support board in the transverse direction, by exerting a transverse force onto the elastic bar. When the elastic bar is moved inside, the lateral edge of the support board is elastically deformed. As the bar is elastic, it moves back into its previous configuration, when no transverse force is exerted onto the elastic bar anymore.

The combination of an opening and an elastic bar, defining an outer rim of the opening, provides a spring element which may interact with an undercut section for securely fixing the support board within the receiving space and which is easy to produce, for example by punching the opening out of the support board.

In an embodiment, the elastic bar extends substantially straight along the lateral edge of the support board. Such a straight elastic bar is easy to produce, for example by punching an opening out of the support board next to the bar.

In an embodiment, the elastic bar has a curved configuration or a trapezoidal configuration including a central portion, which is arranged in some distance from the outer lateral edge of the support board in the transverse direction. Such a curved or trapezoidal configuration may increase the elastic force, which is generated when the elastic bar is deformed by exerting a force onto the elastic bar, in particular onto a middle portion of the elastic bar, for pressing the elastic bar in the transverse direction towards the support board.

In an embodiment, the elastic bar has a trapezoidal configuration, including a central portion, which extends along a straight line basically parallel to the longitudinal direction, and two slanted portions, respectively extending between one end of the central portion and the lateral edge of the support board.

In an embodiment, the elastic bar comprises an engaging protrusion, which extends from the elastic bar in the transverse direction. The engaging protrusion may in particular be formed on a central portion of the elastic bar. Such an engaging protrusion may be pressed into a wall of the supporting profile, in particular a wall of one of the slots of the supporting profile, for securely fixing the support board within the supporting profile. In order to facilitate pressing the engaging protrusion into the supporting profile, the engaging protrusion may be made of a material, which is harder than the material of the base. Additionally or alternatively, the engaging protrusion may comprise at least one sharp edge, which is configured for cutting and/or entrenching itself into the material of the base.

In an embodiment, each of the two lateral edges of the support board comprises at least one spring element, respectively. In such an embodiment, elastic forces acting in two opposing directions are exerted onto the support board when the opposing lateral sides of the support board have been introduced into into the slots of the undercut sections and the spring elements are deformed. As a result, the support board may be centered within the receiving space in the transverse direction by the elastic forces, which are exerted onto the support board by the spring elements.

One or more spring elements may be formed on each of the two lateral edges of the support board, respectively.

Forming only a single spring element on each of the two lateral edges of the support board may result in a structurally simple support board, which may be produced at relatively low costs.

By forming more than one spring element on each of the two lateral edges of the support board, the total elastic force, which is exerted onto the support board, may be increased. Further, by forming more than one spring element on each of the two lateral edges of the support board, the forces acting onto the lateral edges of the support board in the transverse direction may be distributed more uniformly along the longitudinal direction. As result, the risk of an undesirable tilting or canting of the support board within the receiving space may be reduced.

In an alternative embodiment, one spring element or more than one spring element may be formed on only one of the two lateral edges of the support board. Such an embodiment, in which the at least one spring element is formed on only one of the two lateral edges of the support board, may allow for a less complex manufacturing of the support board.

In an embodiment, which comprises a plurality of spring elements, all spring elements may be of the same type, i.e. all spring elements may comprise an elastic finger, or all spring elements may comprise an opening and an elastic bar, as it has been described before. In an embodiment, in which all spring elements are of the same type, all spring element may be identical, i.e. the elements of all spring elements may have the same dimensions. The spring elements formed on opposing lateral edges of the support board may be formed symmetrically identical with respect to each other.

In another embodiment, the support board may comprise spring elements of at least two different types. For example, at least one of the spring elements may comprise an elastic finger, and at least one of the spring elements may comprise an opening in combination with an elastic bar. Spring elements of different types may be provided on the same lateral side of the support board. Alternatively, spring elements of the same type may be provided on a first lateral side of the support board and spring elements of a different type may by provided on a second lateral side of the support board.

In an embodiment, the support board is flexible, in particular bendable. The support board may in particular be bendable in the transverse direction. Bending the support board in the transverse direction may make the installation of the support board within the receiving space of the supporting profile easier, it may in particular make introducing the lateral edges of the support board into the slots provided by the undercut sections easier.

In an embodiment, the support board is a printed circuit board, which comprises electrically conducting paths for supplying electric energy to the at least one light source and/or to at least one other electric component, which is supported by the support board.

In an embodiment, the support board is made of a material comprising fiberglass-reinforced epoxy-laminated sheets, it may in particular be made of FR4. These materials have been found as well-suited for manufacturing the support board, in particular for producing a support board which is a printed circuit board with electrically conducting paths.

In an embodiment, the supporting profile is an extrusion profile. Extrusion has been found to be a well-suited and efficient method for producing the supporting profile. Extrusion is in particular well suited for producing a supporting profile comprising undercuts as described herein.

In an embodiment, the supporting profile is made of metal, for example aluminum or an alloy comprising aluminum. In another embodiment, the profile is made of a plastic material, such as polycarbonate or a material comprising fiberglass-reinforced epoxy-laminated sheets, for example FR4. These materials have been found to be well-suited for producing a supporting profile according to an exemplary embodiment of the invention. A metal, such as aluminum or an aluminum alloy, has a high thermal conductivity. A high thermal conductivity of the supporting profile is beneficial for efficiently dissipating heat, which is generated by operating the at least one light source, via the supporting profile from the support board, in order to avoid overheating the at least one light source and/or another electric component mounted to the support board.

In an embodiment, the aircraft light comprises a plurality of support boards, and at least one of the plurality of support boards comprises at least one spring element for elastically fixing the respective support board within the receiving space of a corresponding supporting profile. In an embodiment, a subset of the plurality of support boards or all of the plurality of support boards comprise at least one spring element for elastically fixing the respective support board within the receiving space of a corresponding supporting profile.

In an embodiment, which comprises a plurality of support boards, all support boards may be arranged in a single supporting profile. The support boards may in particular be arranged next to each other in a row extending along the longitudinal direction of the supporting profile. Adjacent support boards may abut against each other, or gaps may be formed between adjacent support boards, so that adjacent support boards do not contact each other.

In an embodiment, the plurality of support boards may be supported by a plurality of supporting profiles. One or more than one support boards may be supported by each of the plurality of supporting profiles, respectively. The plurality of supporting profiles may be arranged along a straight row of supporting profiles extending in the longitudinal direction. Adjacent supporting profiles may abut against each other, or gaps may be formed between adjacent supporting profiles, so that adjacent supporting profiles do not contact each other. At least one of the plurality of supporting profiles may be arranged separately from the other supporting profiles, i.e. in a configuration, which differs from a straight row of supporting profiles.

In an embodiment, each of the plurality of support boards supports at least one light source. At least some of the support boards may support more than one light source. The number of light sources, which are supported by each of the support boards, may be different according to the actual needs. A single aircraft light may comprise a plurality of support boards, wherein the numbers of light sources supported by each support board may be identical or different.

In an embodiment, the plurality of support boards comprise at least one first support board, which supports at least one electric light source, and at least one second support board, which supports electric circuitry which does not include any electric light source.

Combining a plurality of support boards, wherein the plurality of support boards include support boards which do not support any light sources, support boards which support one light source, and/or support boards which support more than one light source, may allow for composing a plurality of different aircraft lights, which may be adjusted to various needs, from a relatively small number of different components. Thus, different aircraft lights may be combined from a relatively small number of different components. These components may be produced in large numbers at relatively low costs. As a result, aircraft lights having different configurations may be assembled at relatively low costs.

In an embodiment, the aircraft light is an interior aircraft light, i.e. an aircraft light which is installed within an aircraft, in particular within the passenger cabin of an aircraft. The aircraft light may in particular be an interior air plane light or an interior helicopter light.

In an embodiment, the interior aircraft light is a lavatory illumination light, which is configured to be installed in a lavatory of an aircraft. In an embodiment, the aircraft light is a galley illumination light, which is configured to be installed in a galley of an aircraft.

In an embodiment, the aircraft light is an aisle illumination light, which is configured to be installed along an aisle, for example on a ceiling or at a floor, in a passenger cabin of an aircraft for guiding passengers along the aisle in a dark environment.

In an embodiment, the aircraft light is a cabin illumination light, which may be installed along an overhead baggage compartment or along a row of overhead baggage compartments in a passenger cabin for illuminating the passenger cabin.

The aircraft light may be configured to be mounted to a front side of the overhead baggage compartment(s) facing an aisle. The aircraft light may also be configured to be mounted to a backside of the overhead baggage compartment(s). The aircraft light may in particular be configured to be mounted in a gap, which is formed between the overhead baggage compartment(s) and a wall of the passenger cabin, for illuminating the passenger cabin indirectly by illuminating the wall of the passenger cabin.

In an embodiment, the aircraft light is an exterior aircraft light, in particular a stabilizer illumination light, which is configured for illuminating a portion of the exterior of an aircraft, in particular for illuminating a stabilizer of an aircraft, more particularly for illuminating a logo on the exterior of the aircraft, in particular on the vertical stabilizer of the aircraft. Such an exterior aircraft light may allow for an efficient illumination of the exterior of an aircraft, in particular for an efficient illumination of the vertical stabilizer and/or at least one logo on the exterior of the aircraft.

Exemplary embodiment of the invention also include an aircraft, such as an air plane or a helicopter, which is equipped with at least one aircraft light according to an exemplary embodiment of the invention. The additional features, modifications and effects, as described above with respect to the aircraft light, apply to the aircraft in an analogous manner.

An aircraft according to an exemplary embodiment of the invention may comprise an interior aircraft light in accordance with an exemplary embodiment of the invention, in particular at least one of a lavatory illumination light, which is installed in a lavatory of the aircraft; a galley illumination light, which is installed in a galley of the aircraft; a cabin illumination light, which installed along an aisle, in particular at the ceiling or on the floor of a passenger cabin; and a cabin illumination light, which is installed along an overhead baggage compartment of a passenger cabin for illuminating the passenger cabin.

An aircraft according to an exemplary embodiment of the invention may also comprise an exterior aircraft light in accordance with an exemplary embodiment of the invention. The aircraft may in particular comprise an exterior aircraft light which is a stabilizer illumination light, which is configured and mounted to the exterior of the aircraft for illuminating a portion of the exterior of the aircraft, in particular for illuminating a stabilizer of the aircraft, more particularly for illuminating a logo, which is visible on the exterior of the aircraft, in particular on the vertical stabilizer of the aircraft.

BRIEF DESCRIPTION OF THE DRAWINGS

Further exemplary embodiments of the invention are described below with respect to the accompanying drawings, wherein.

DETAILED DESCRIPTION

Figure 1:
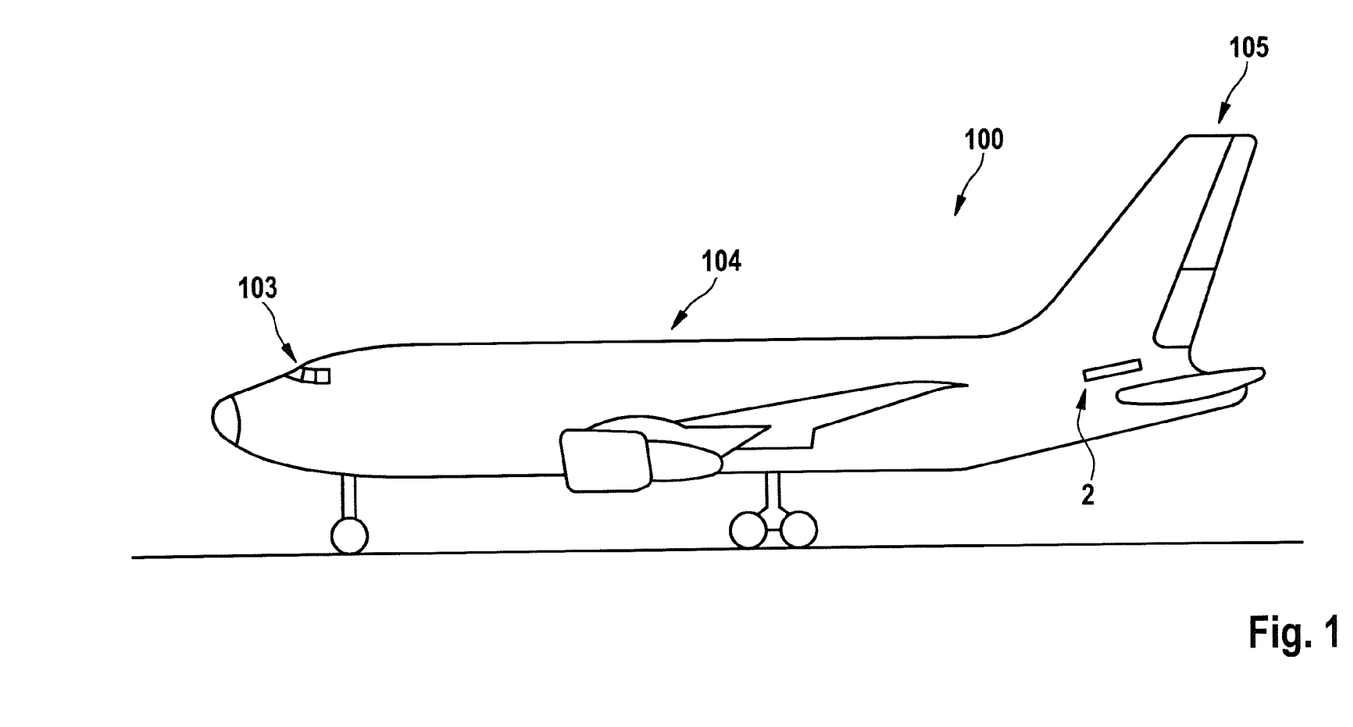
FIG. 1 depicts a schematic side view of an aircraft in accordance with an exemplary embodiment of the invention.

FIG. 1 depicts a schematic side view of an aircraft 100, in particular of an air plane, in accordance with an exemplary embodiment of the invention. In the exemplary embodiment shown in FIG. 1, the aircraft 100 is a large passenger air plane comprising a cockpit 103 and a passenger cabin 104. The aircraft 100 may be a commercial passenger air plane, a private air plane, or a military aircraft. It is also possible that the aircraft light according to an exemplary embodiment of the invention is implemented in a rotorcraft, such as a helicopter.

The aircraft 100 comprises a vertical stabilizer 105. An aircraft light 2 according to an exemplary embodiment of the invention may by mounted as an exterior aircraft light 2 to the fuselage of the aircraft 100 for illuminating a portion of the outer surface of the aircraft 100. The aircraft light 2 may, for example, be configured for illuminating the vertical stabilizer 105, in particular for illuminating a logo which might be displayed on the vertical stabilizer 105.

Figure 2:
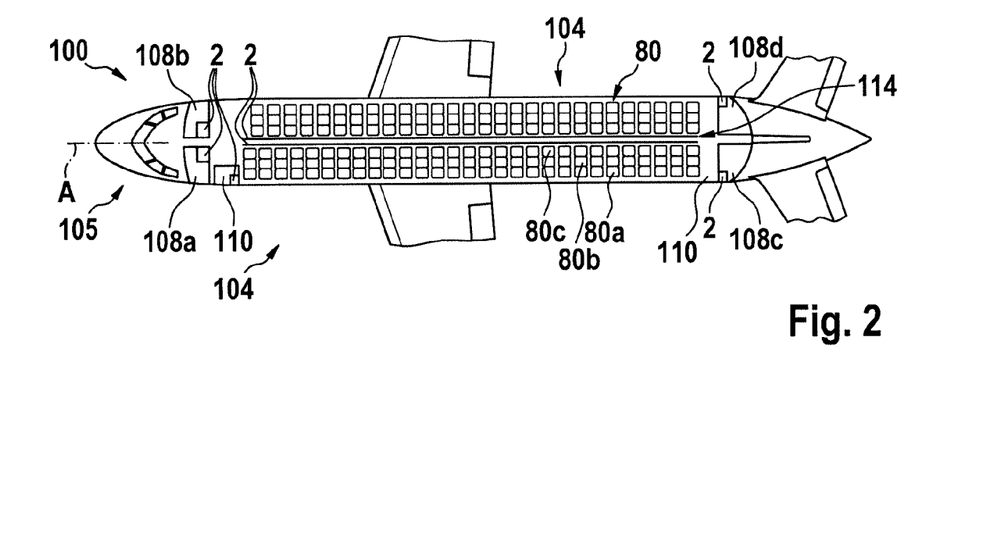
FIG. 2 depicts a schematic cut-open view of the aircraft shown in FIG. 1, depicting the passenger cabin of the aircraft.

FIG. 2 depicts a schematic cut-open view of the aircraft 100, depicting the passenger cabin 104 of the aircraft 100, also referred to as aircraft passenger cabin 104 herein.

The aircraft passenger cabin 104 is equipped with a plurality of passenger seats 80a, 80b, 80c. The passenger seats 80a, 80b, 80c are arranged next to each other forming a plurality of passenger seat rows 80. Each passenger seat row 80 comprises two groups of passenger seats, respectively including three passenger seats 80a, 80b, 80c. The two groups of passenger seats 80a, 80b, 80c are separated from each other by a central aisle 114, extending along a longitudinal axis A of the aircraft 100.

The aircraft passenger cabin 104 is further equipped with four lavatories 108a-108d. In the exemplary configuration depicted in FIG. 2, the four lavatories 108a-108d are provided at four locations within the aircraft passenger cabin 104. A first lavatory 108a is located at the front portside end of the aircraft passenger cabin 104, a second lavatory 108b is located at the front starboard end of the aircraft passenger cabin 104, a third lavatory 108c is located at the rear portside end of the aircraft passenger cabin 104, and a fourth lavatory 108d is located at the rear starboard end of the aircraft passenger cabin 104. Additionally or alternatively, lavatories 108a-108d may be provided at other locations of the aircraft passenger cabin 104 as well.

The aircraft passenger cabin 104 is further equipped with a galley 110, in order to allow for preparing meals and drinks for the passengers.

At least one of the lavatories 108a-108d and the galley 110 may be provided with an interior aircraft light 2 according to an exemplary embodiment of the invention.

Further, interior aircraft lights 2, which may be aircraft lights 2 according to exemplary embodiments of the invention, extend along the aisle 114 in the longitudinal direction for indicating the aisle 114 to the passengers, in particular in an emergency situation, in which the main lighting in the passenger cabin 104 does not work. The interior aircraft lights ("aisle lights") 2, which extend along the aisle 114, may be provided on or within a floor 110 the passenger cabin 104. Alternatively or additionally, the interior aircraft lights 2 may be mounted to a ceiling of the aircraft passenger cabin 104 above the aisle 114.

Figure 3A:
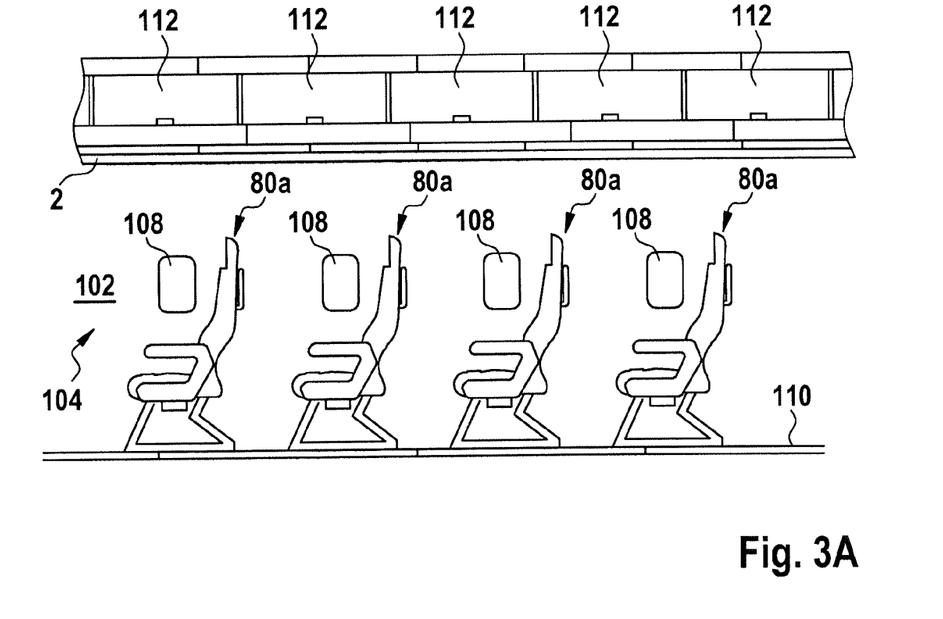
FIG. 3A shows a schematic longitudinal cross-sectional view of a section of the passenger cabin of the aircraft.
Figure 3B:
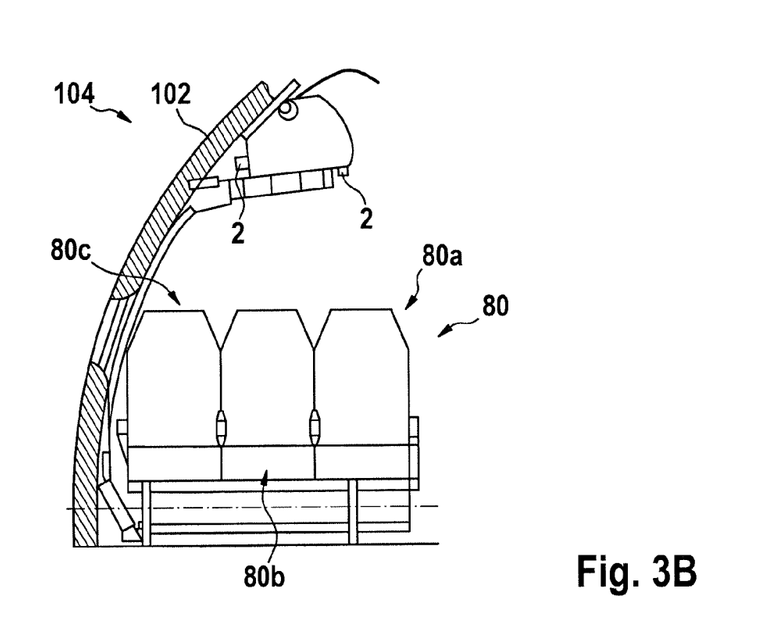
FIG. 3B shows a schematic partial transverse cross-sectional view of the passenger cabin depicted in FIG. 3A.

FIG. 3A shows a schematic longitudinal cross-sectional view of a section of the passenger cabin 104 of the aircraft 100 shown in FIG. 1. FIG. 3B shows a schematic partial transverse cross-sectional view of the passenger cabin 104. The plane of the transverse cross-sectional view of FIG. 3B is oriented orthogonal to the plane of the longitudinal cross-sectional view depicted in FIG. 3A.

Four seats 80a, also referred to as passenger seats 80a, are shown in FIG. 3A. The passenger seats 80a are mounted to the floor 110 of the passenger cabin 104. Each of the depicted passenger seats 80a belongs to a different seat row 80.

For each of the seat rows 80, a window 108 is provided, which allows the passengers to view the outside of the aircraft 100. Further, a plurality of overhead baggage compartments 112 are shown, which provide storage space for the passengers' baggage.

Each seat row 80 includes three passenger seats 80a, 80b, 80c arranged next to each other, as shown in FIG. 3B. The second and third passenger seats (middle seat and window seat) 80b, 80c of each seat row 80 are not visible in FIG. 3A, as they are arranged behind and therefore hidden by the depicted first passenger seats (aisle seats) 80a.

An aircraft light 2 according to an exemplary embodiment of the invention is provided above the passenger seats 80a, 80b, 80c. The aircraft light 2 extends along the longitudinal direction of the passenger cabin 104. The aircraft light 2 may be installed at or below the overhead baggage compartments 112, as it is depicted in FIGS. 3A and 3B.

An aircraft light 2 according to an exemplary embodiment of the invention may also be installed between the overhead baggage compartments 112 and the wall 102 of the passenger cabin 104, as it is depicted in FIG. 3B. Such an aircraft light 2 may indirectly illuminate the passenger cabin 104 by illuminating the wall 102 of the passenger cabin 104.

Figure 4:
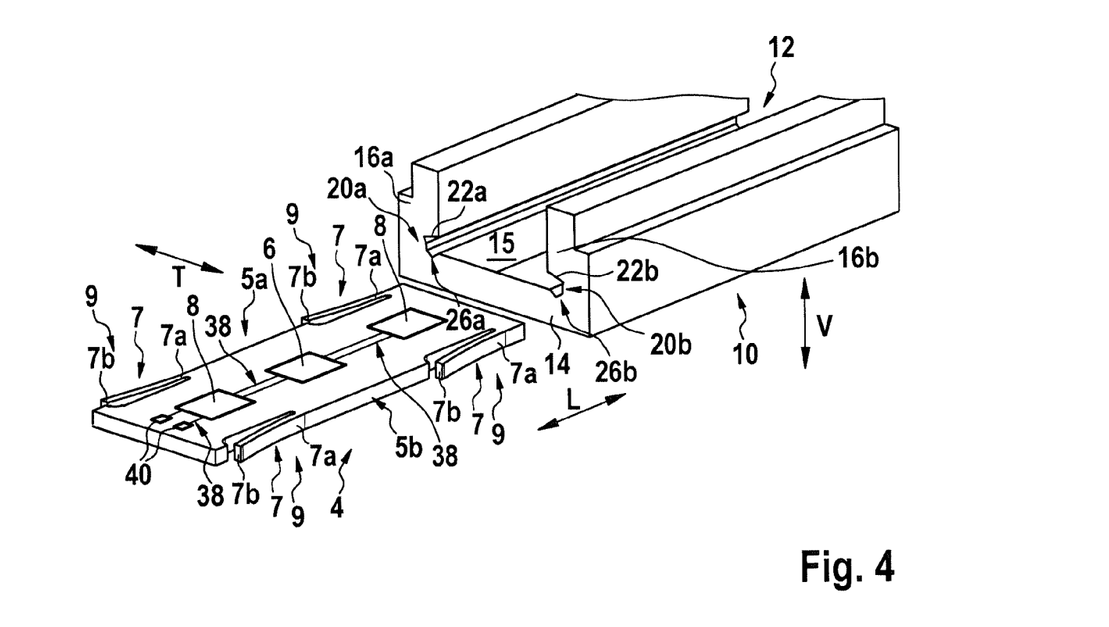
FIG. 4 shows a perspective view of an aircraft light according to an exemplary embodiment of the invention in a pre-assembled state.
Figure 5A:
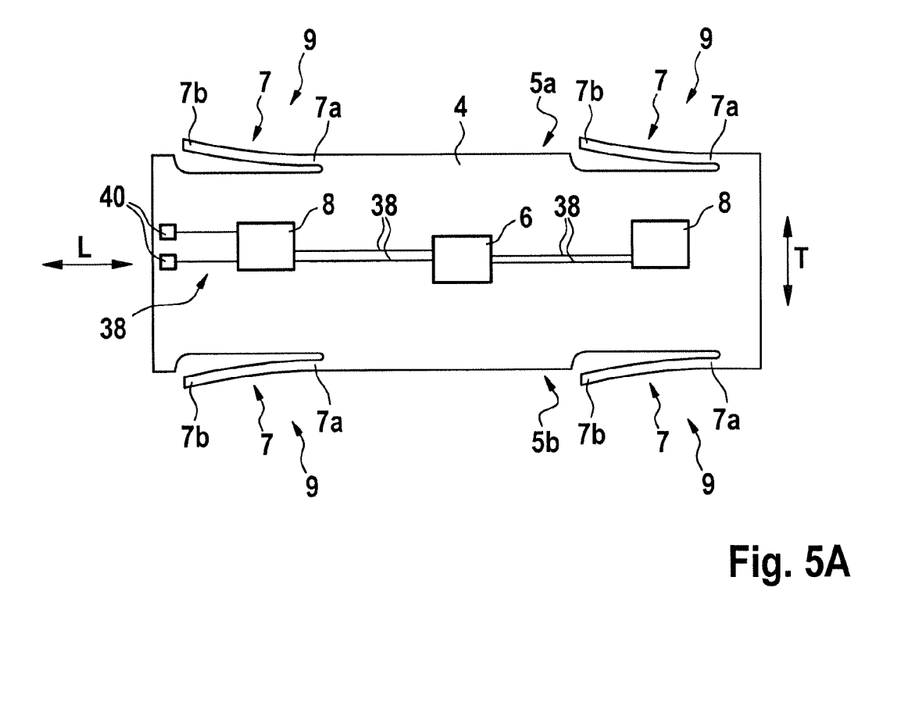
FIG. 5A shows a plan view of a support board of an aircraft light according to an exemplary embodiment of the invention.
Figure 5B:
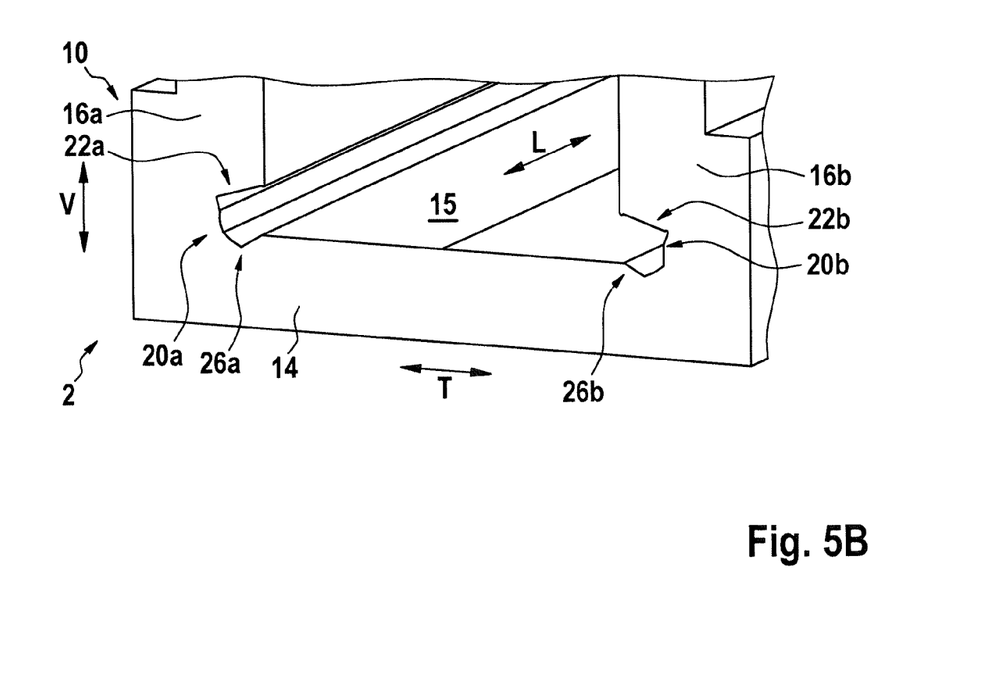
FIG. 5B shows a perspective view of a supporting profile of an aircraft light according to an exemplary embodiment of the invention.
Figure 6:
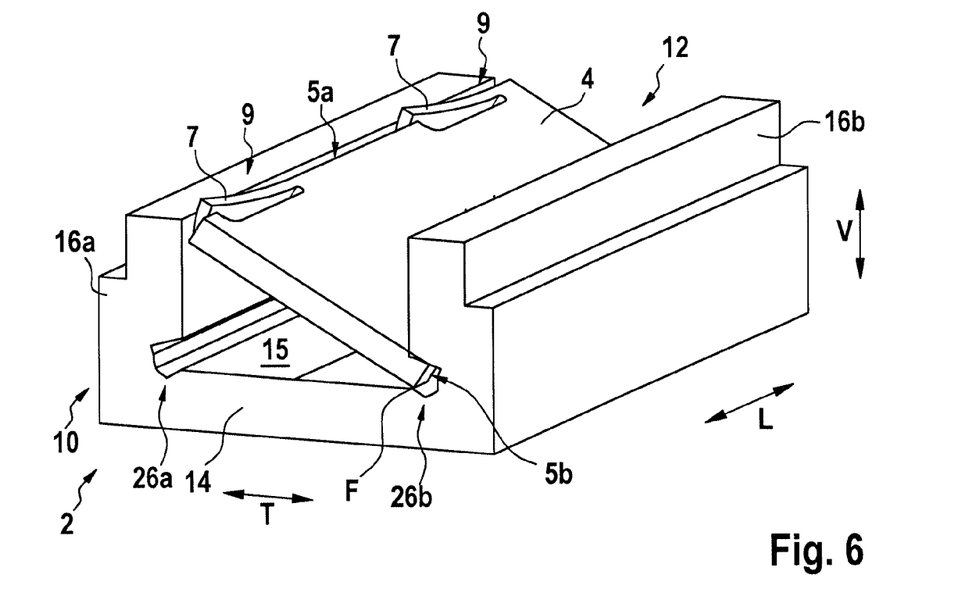
FIG. 6 shows a perspective view of an aircraft light according to an exemplary embodiment of the invention in an intermediate state during assembly.
Figure 7:
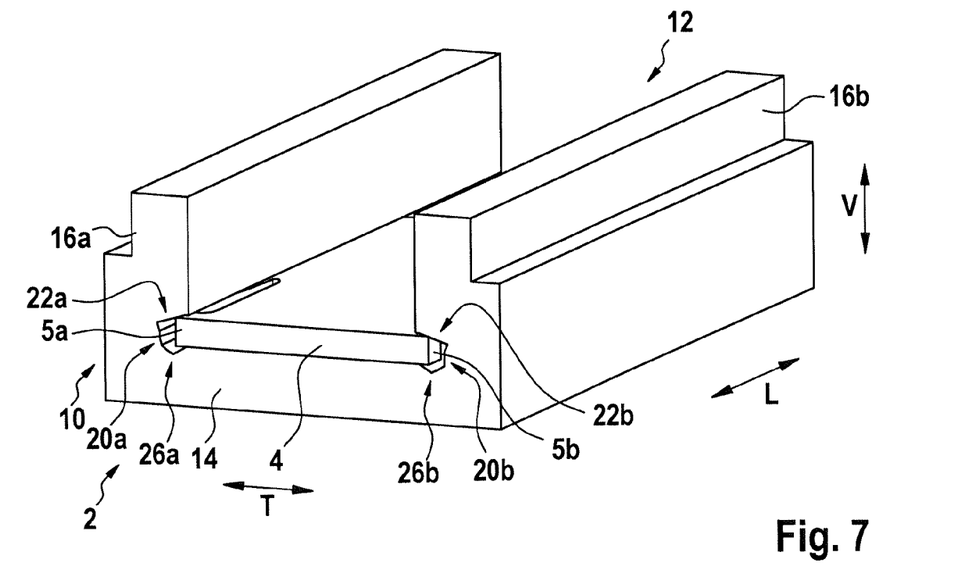
FIG. 7 shows a perspective view of an aircraft light according to an exemplary embodiment of the invention in an assembled state.

FIGS. 4, 6, and 7 are perspective views of an aircraft light 2 according to an exemplary embodiment of the invention. FIG. 5A shows a plan view of a support board 4 of an aircraft light 2 according to an exemplary embodiment of the invention, and FIG. 5B shows a perspective view of a supporting profile 10 of an aircraft light 2 according to an exemplary embodiment of the invention.

In the following description, terms referring to spatial directions, such as upper, lower, top, bottom, longitudinal, transverse, lateral etc. refer to the spatial orientation of the aircraft light 2 as it is depicted in FIGS. 4 to 7. The person skilled in the art understands that an aircraft light 2 according to an exemplary embodiment of the invention may be installed in different orientations, in particular in an upside-down orientation, in which the supporting profile 10 is arranged above the support board 4. In the following, the terms referring to spatial directions are therefore used only for enhancing the clarity of the description with respect to FIGS. 4 to 7, but these terms are not to be understood as limiting an aircraft light 2 according to exemplary embodiments of the present invention to a specific spatial orientation.

According to an exemplary embodiment of the invention, the aircraft light 2 comprises a support board 4 and a supporting profile 10. The supporting profile 10 has a receiving space 12 for receiving and supporting the support board 4.

FIGS. 4, 5A and 5B depict the support board 4 and the supporting profile 10 of an aircraft light 2 according to an exemplary embodiment of the invention in a pre-assembled state, i.e. in a state in which the support board 4 and the supporting profile 10 are arranged separately from each other.

FIG. 7 depicts a perspective view of the aircraft light 2 in an assembled state, in which the support board 4 is arranged and fixed in its final position within the receiving space 12 of the supporting profile 10.

FIG. 6 depicts the aircraft light 2 in an intermediate state of assembly, in which the support board 4 is located within the receiving space 12 of the supporting profile 10, but in which the support board 4 is not yet arranged in its final position in which it is fixed within the receiving space 12.

In the exemplary configuration depicted in FIGS. 4 to 7, the support board 4 supports a light source 6, for example an LED 6, and electric circuitry 8 including two electric elements 8, which are employed for operating the light source 6. These further electric elements 8 may include a driver circuit for driving the light source, a control circuit for controlling the operation of the light source 6, and/or a sensor, for example a light intensity sensor, which may be employed for operating the light source 6 based on an amount of ambient light, which is detected in the vicinity of the aircraft light 2.

The configuration depicted in FIGS. 4 to 7, in which the support board 4 supports a single light sources 6 and two further electric elements 8, is only an exemplary configuration. In further configurations, the support board 4 may support a plurality of light sources 6 and/or more or less than two further electric elements 8.

The support board 4 extends in a longitudinal direction L and in a transverse direction T, which is oriented orthogonal to the longitudinal direction L. The supporting profile 10 and the receiving space 12, which is formed within the supporting profile 10, extend in the longitudinal direction L and in the transverse direction T as well.

The supporting profile 10 comprises a base 14 and two lateral side walls 16a, 16b, which are arranged opposite to each other in the transverse direction at two opposing lateral sides of the base 14. The two lateral side walls 16a, 16b extend from the base 14 in a basically vertical direction V, which is orientated orthogonal to a virtual plane spanned by the longitudinal direction L and the transverse direction T.

In consequence, the receiving space 12 is defined from below by the base 14, in particular by an upper surface 15 of the base 14, and the receiving space 12 is defined in the transverse direction T by the two side walls 16a, 16b. The receiving space 12 is open to the top, and in the longitudinal direction L.

The distance between the two side walls 16a, 16b in the transverse direction T may be between 5 mm and 50 mm, in particular between 10 mm and 30 mm, more particularly between 14 mm and 18 mm.

A respective undercut section 20a, 20b is formed in each of the two side walls 16a, 16b. The undercut sections 20a, 20b are formed at the lateral outer edges of the upper surface 15 of the base 14 and extend within the side walls 16a, 16b in the longitudinal direction L. Each undercut section 20a, 20b comprises a slot, which is open towards the receiving space 12, and which is dimensioned for receiving a respective one of the lateral edges 5a, 5b of the support board 4, as shown in FIGS. 6 and 7.

The extension of each undercut section/slot in the transverse direction T may be between 1 mm and 5 mm, in particular between 1 mm and 3 mm, more particularly between 1.5 mm and 2.0 mm.

The extension of each undercut section 20a, 20b in the vertical direction V may be between 1 mm and 5 mm, in particular between 1 mm and 3 mm, more particularly between 1.5 mm and 2.0 mm.

Each undercut section 20a, 20b comprises an upper fixing surface 22a, 22b, which limits the undercut section 20a, 20b in the vertical direction V.

In the embodiment depicted in FIGS. 4 to 7, the upper fixing surfaces 22a, 22b are inclined with respect to the transverse direction T. The upper fixing surfaces 22a, 22b are in particular inclined with respect to the transverse direction T by an angle α in the range of between 5° and 30°, further in particular by an angle ≠ in the range of between 10° and 20°, yet further in particular by an angle α of 15°.

Said inclination of the upper fixing surfaces 22a, 22b strengthens the fixation of the support board 4 within the receiving space 12, as the lateral edges 5a, 5b of the support board 4 may be squeezed and clamped between the upper fixing surface 22a, 22b of the respective undercut section 20a, 20b and the upper surface 15 of the base 14, when a lateral edge 5a, 5b of the support board 4 is inserted into the slot of the respective undercut section 20a, 20b (see FIG. 7).

The inclination of the upper fixing surfaces 22a, 22b also helps in introducing one of the lateral edges 5a, 5b of the support board 4 into the respective undercut section 20a, 20b, when the support board 4 is oriented in an inclined configuration with respect to the upper surface 15 of the base 14, as it is for example depicted in FIG. 6.

Each undercut section 20a, 20b further comprises a groove 26a, 26b, which is formed within the base 14 opposite to the upper fixing surface 22a, 22b of the respective undercut section 20a, 20b.

Each groove 26a, 26b extends in the longitudinal direction L of the supporting profile 10. The grooves 26a, 26b help with the installation of the support board 4 within the receiving space 12 as, in the course of the installation process, one of the lateral edges 5a, 5b of the support board 4 may be introduced into one of the groves 26a, 26b, in particular when the support board 4 is arranged in an inclined orientation within the receiving space 12, as it is depicted in FIG. 6.

For installing the support board 4 within the receiving space 12, in a first step, the support board 4 may be arranged in an inclined orientation within the receiving space 12, with the lateral edge 5b being inserted into the corresponding undercut section 20b, in particular within the groove 26b of the corresponding undercut section 20b (see FIG. 6).

In a following second step, the opposing free lateral edge 5a of the support board 4, i.e. the lateral edge 5a of the support board 4 that has not been introduced into the groove 26b, may be lowered into the receiving space 12 by pivoting the support board around a fulcrum F (see FIG. 6). The fulcrum F is the point of contact between the support board 4 and the upper surface 15 of the base 14. Finally, the support board 4 is fixed within the receiving space 12 by inserting the free lateral edge 5a into the corresponding slot of the undercut section 20a, which is formed within the opposing side wall 16a (see FIG. 7).

In the configuration depicted in FIGS. 4 to 7, two elastic spring elements 9 are formed on each lateral edge 5a, 5b of the support board 4, respectively, for elastically fixing the support board 4 within the receiving space 12.

Each spring element 9 comprises an elastic finger 7, which basically extends into the longitudinal direction L. Each finger has a fixed end 7a, which is formed integrally with or is attached to the support board 4, and a free end 7b, which is spaced apart from the support board 4 in the transverse direction.

When the support board 4 is accommodated and fixed within the receiving space 12 of the supporting profile 10, as it is depicted in FIG. 7, the free ends 7a of the spring elements 9 press elastically against the outer walls of the slots of the undercut sections 20a, 20b. As a result, the elastic forces, which are exerted by the spring elements 9, fix the support board 4 within the receiving space 12.

In the embodiment depicted in FIGS. 4 to 7, the spring elements 9 are formed symmetrically on both lateral edges 5a, 5b of the support board 4. In consequence, the elastic forces, exerted by the spring elements 9, center the support board 4 within the receiving space 12 along the transverse direction T. As a result, the support board 4 is positioned and fixed in a central position within the receiving space 12.

In other embodiments, which are not explicitly shown in the figures, more or less than two spring elements 9 may be formed on each lateral edge 5a, 5b of the support board 4, respectively. It is also possible that one or more spring elements 9 may be formed on only one of the lateral edges 5a, 5b of the support board 4, and no spring element 9 is formed on the other lateral edge 5a, 5b of the support board 4.

In an embodiment, in which spring elements 9 are formed on both lateral edges 5a, 5b of the support board 4, the spring elements 9 may be arranged in a pairwise configuration, wherein each pair comprises one spring element 9 on each of the lateral edges 5a, 5b of the support board 4. The two spring elements 9 of each pair may be formed at the same position along the longitudinal direction L of the two lateral edges 5a, 5b of the support board 4, as it is depicted in FIGS. 4 to 7. Such a configuration may result in a very efficient centering of the support board 4 within the receiving space 12 in the transverse direction T.

In an alternative embodiment, which is not depicted in the Figures, the spring elements 9, which are formed on the two lateral edges 5a, 5b of the support board 4, may be arranged at different positions along the longitudinal direction L. Spring elements 9 may for example be formed in an alternating manner on the two lateral edges 5a, 5b of the support board 4 along the longitudinal direction L. In other words, a first spring element 9 may be formed at the first lateral edge 5a at a first position along the longitudinal direction L, a second spring element 9 may be formed at the second lateral edge 5b at a second position along the longitudinal direction L, a third spring element 9 may be formed at the first lateral edge 5a at a third position along the longitudinal direction L, and a fourth spring element 9 may be formed at the second lateral edge 5b at a fourth position along the longitudinal direction L, wherein the second position is between the first and third positions along the longitudinal direction L, and wherein the third position is between the second and fourth positions along the longitudinal direction L. The support board 4 may comprise additional spring elements 9, which are formed at the first and second lateral edges 5a, 5b in the same alternating scheme.

The spring elements 9 may include other structures than the elastic fingers 7, which are depicted in FIGS. 4 to 7.

Figure 8:
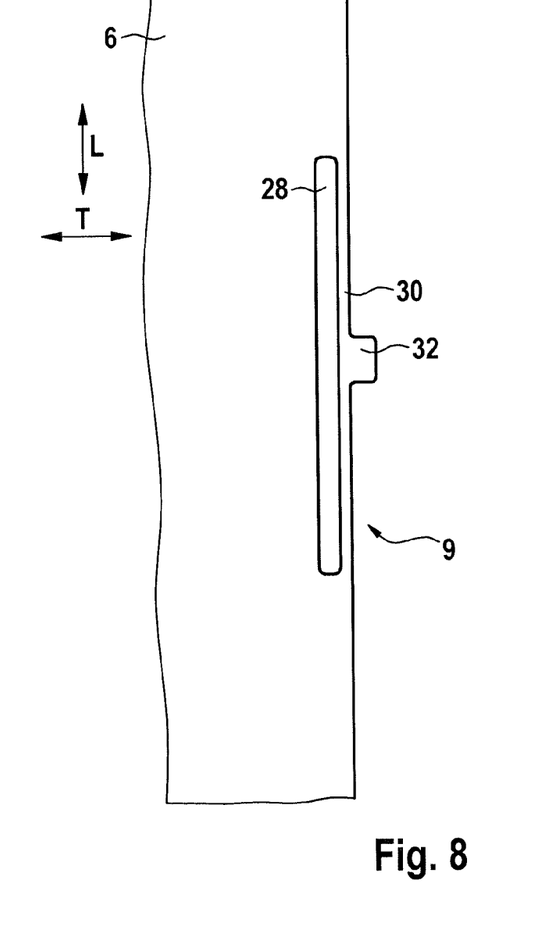
FIG. 8 shows a plan view of a lateral edge of a support board of an aircraft light according to an exemplary embodiment of the invention, including a particular type of spring element.
Figure 9:
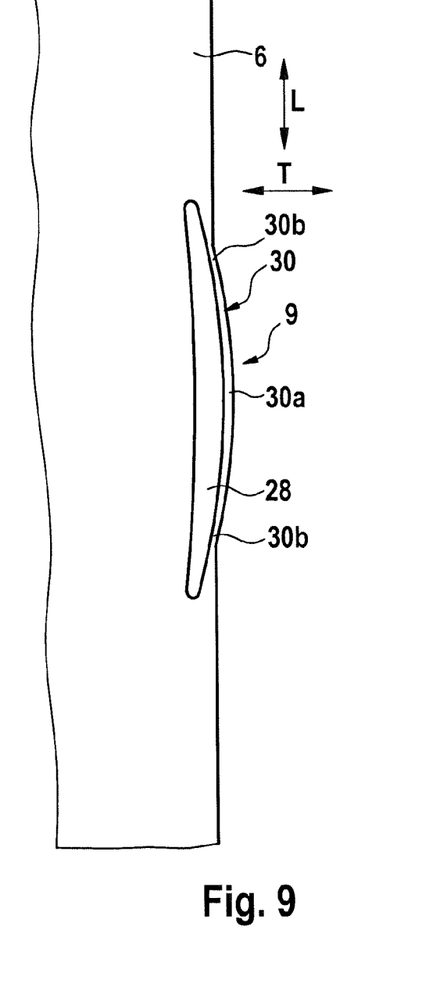
FIG. 9 shows a plan view of a lateral edge of a support board of an aircraft light according to an exemplary embodiment of the invention, including another type of spring element.

Examples of two alternative configurations of the spring elements 9 are depicted in FIGS. 8 and 9.

In the alternative configurations depicted in FIGS. 8 and 9, each of the spring elements 9 includes an opening 28, in particular a longitudinal opening 28 or slit, which extends along the longitudinal direction next to a lateral edge 5b of the support board 4. An elastic bar 30 defines an outer rim portion of the opening 28 and simultaneously forms the lateral edge 5b of the support board 4 in a section of the support board 4, which is next to the opening 28.

The elastic bar 30 may be made from the same material as the support board 4. Alternatively, the elastic bar 30 may be made of a different material. The elastic bar 30 may be formed integrally with the support board 4, for example by punching the opening 28 out of the support board 4.

The opening 28 and the elastic bar 30 may extend substantially straight along the lateral edge 5b of the support board 4 in the longitudinal direction L, as it is depicted in FIG. 8.

In an alternative configuration, the elastic bar 30 may have a curved configuration or a trapezoidal configuration, in which at least a portion of the elastic bar 30 is at least partially located in some distance from the lateral edge 5b of the support board 4 in the transverse direction T, as it is depicted in FIG. 9.

In such a configuration, the elastic bar 30 may comprise a central portion 30a and two slanted portions 30b. The central portion 30a may extend basically along a straight line, which is oriented parallel to the longitudinal direction L. The two slanted portions 30b extend between one end of the central portion 30a and the lateral edge 5b of the support board 4, respectively. The two slanted portions 30b may be formed straight or slightly curved.

A curved or trapezoidal configuration, as it is depicted in FIG. 9, may be formed by punching the opening 28 out of the support board 4 and subsequently bending the elastic bar 30, which has been formed by punching the opening 28, outwards for forming the curved or trapezoidal shape of the elastic bar 30, as it is for example depicted in FIG. 9.

An engaging protrusion 32, which extends outwardly from the support board 4 in the transverse direction T (see FIG. 8), may be formed on the outside of the elastic bar 30, i.e on the side of the elastic bar 30 facing away from the support board 4. The engaging protrusion 32 may in particular extend from a central portion of the elastic bar 30.

In a configuration comprising an engaging protrusion 32, the engaging protrusion 32 may contact the outer wall of the undercut section 20*a*, 20*b*, when the support board 4 is arranged in the receiving space 12 of the support board, as it is depicted in FIG. 7.

The engaging protrusion 32 may be made of a material, which has a larger hardness than the material of the supporting profile 10, and/or the engaging protrusion 32 may have at least one sharp edge.

Due to the elastic force exerted onto the engaging protrusion 32, such an engaging protrusion 32 may entrench itself into the outer wall of the undercut section 20*a*, 20*b*, when the support board 4 is arranged in the receiving space 12 of the support board, as it is depicted in FIG. 7.

Such an entrenching of the engaging protrusion 32 may result in a very secure fixing of the support board 4 within the supporting profile 10, in particular in a fixation which may reliably prevent an undesired movement of the support board 4 in the longitudinal direction L.

In a configuration in which the support board 4 comprises a plurality of spring elements 9, all spring elements 9 may be of the same type. All spring elements 9 may, for example, be spring elements 9 comprising elastic fingers 7, as they are depicted in FIGS. 4 to 7. Alternatively, all spring elements 9 may include a combination of an opening 28 and an elastic bar 30, as it is depicted in FIGS. 8 and 9. All spring elements 9 may in particular be identical or symmetrically identical with respect to each other.

In another embodiment, a single support board 4 may be equipped with at least two different types of spring elements 9. The support board 4 may, for example, be equipped with a mix of different spring elements 9, wherein at least one of the spring element 9 includes an elastic finger 7, as it is depicted in FIGS. 4 to 7, and at least one spring element 9 includes a combination of an opening 28 and an elastic bar 30, as it is depicted in FIGS. 8 and 9.

The support board 4 may be flexible, in particular bendable. The support board 4 may in particular be bendable along the transverse direction T. Bending the support board 4 in the transverse direction T may help in introducing the support board 4 into the receiving space 12 of the supporting profile 10, it may in particular help with inserting the lateral edges 5*a*, 5*b* of the support board 4 into the undercut sections 20*a*, 20*b*, as it is depicted in FIGS. 6 and 7.

The support board 4 may be a printed circuit board (PCB) comprising conductive tracks 38, which are formed on the support board 4 for electrically connecting the at least one light source 6 and/or the further electric elements 8 with each other and/or with terminals 40 (see FIGS. 4 and 5A). The terminals 40 may be configured for electrically coupling the at least one light source 6 and/or the electric circuitry 8 with external electric components, in particular with an external electric power supply (not shown) for supplying electric power to the at least one light source 6 and/or the further electric circuitry 8.

The support board 4 may be made of a material comprising fiberglass-reinforced epoxy-laminated sheets, it may in particular be made of FR4.

The supporting profile 10 may be an extrusion profile, i.e. a profile which was manufactured in an extrusion process.

The supporting profile 10 may be made of metal, such as aluminum or an alloy comprising aluminum. Alternatively, the supporting profile 10 may be made of a plastic material, such as polycarbonate or material comprising fiberglass-reinforced epoxy-laminated sheets, for example FR4.

The aircraft light 2 may comprise a plurality of support boards 4.

Figure 10:
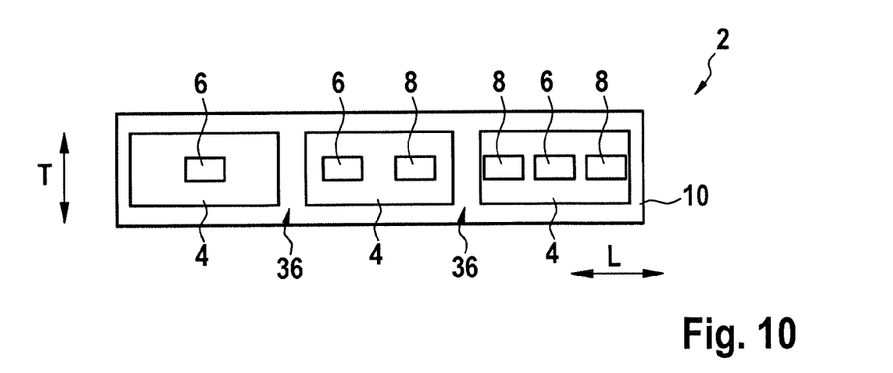
FIG. 10 shows a plurality of support boards of an aircraft light according to an exemplary embodiment of the invention, which are supported next to each other in a single supporting profile, with gaps being formed between adjacent support boards.

Each of the support boards 4 may be equipped with at least one spring element 9, as it has been described before A plurality of support boards 4 may be supported next to each other along the longitudinal direction in a single supporting profile 10, as it is schematically depicted in FIG. 10. The support boards 4 may abut against each other, or a gap 36 may be formed between two adjacent support boards 4.

The aircraft light 2 may also comprise a plurality of supporting profiles 10, wherein each of the supporting profiles 10 comprises a receiving space 12 for accommodating at least one support board 4, respectively.

One or more support boards 4 may be arranged in the receiving space 12 of each supporting profile 10.

Figure 11:
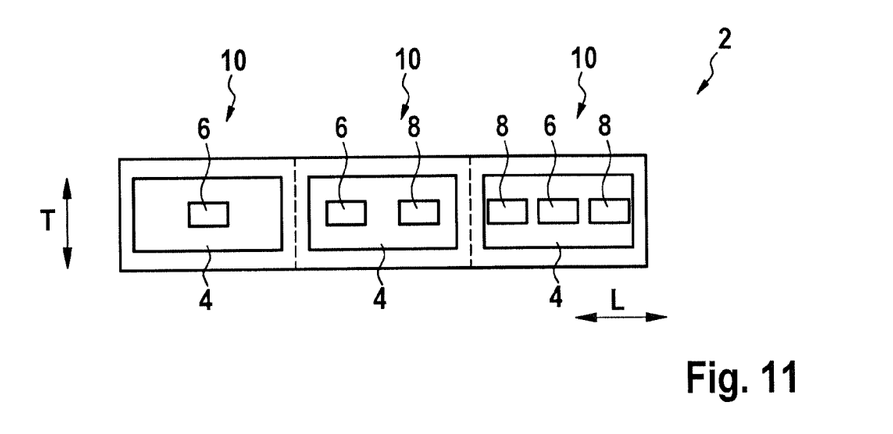
FIG. 11 shows a plurality of support boards of an aircraft light according to an exemplary embodiment of the invention, which are supported next to each other in a single supporting profile, wherein adjacent support boards abut against each other.
Figure 12:
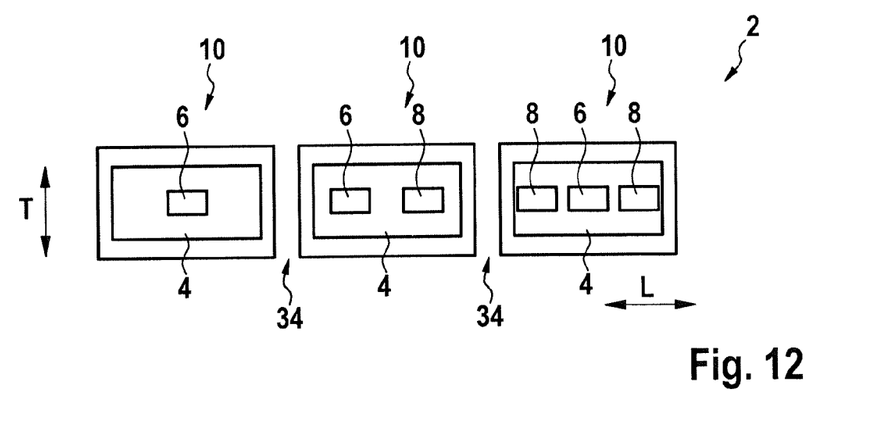
FIG. 12 shows a plurality of supporting profiles of an aircraft light according to an exemplary embodiment of the invention, wherein each supporting profile supports a single support board, and wherein gaps are formed between adjacent supporting profiles.

The supporting profiles 10 may be arranged next to each other along the longitudinal direction L. The supporting profiles 10 may abut against each other, forming a continuous supporting profile 10, as it is depicted in FIG. 11. Alternatively, gaps 34 may be formed between adjacent supporting profiles 10, as it is depicted in FIG. 12.

In a configuration comprising a plurality of support boards 4, at least one electric light source 6 may be supported by each of the support boards 4. In another embodiment, not all, but at least one of the support boards 4 may support at least one electric light source 6, and there may be at least one support board 4 supporting one or more electric elements 8, which do not include an electric light source 6.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft light, comprising:
    a support board supporting at least one electric light source, wherein the support board has two lateral edges, which extend in a longitudinal direction of the support board and which are spaced apart from each other in a transverse direction (T) of the support board; and
    a supporting profile comprising:
        a receiving space for receiving and supporting the support board, wherein the receiving space is defined by a base, extending in a longitudinal direction (L) of the supporting profile and in a transverse direction (T) of the supporting profile, and two opposing side walls protruding from the base;
        two undercut sections, forming opposing slots in the two opposing side walls that are dimensioned for accommodating a lateral edge of the support board, respectively;
        wherein at least one of the two lateral edges of the support board comprises at least one spring element for elastically fixing the support board within the receiving space, with the two lateral edges of the support board being arranged in opposing slots.

2. The aircraft light according to claim 1, wherein at least one of the undercut sections comprises an inclined portion for clamping the support board towards the base.

3. The aircraft light according to claim 1, wherein at least one of the undercut sections comprises a groove, formed within the base.

4. The aircraft light according to claim 1, wherein at least one of the at least one spring element includes an elastic finger, which extends from a lateral edge of the support board.

5. The aircraft light according to claim 1, wherein at least one of the at least one spring element includes a slit, which is located close to a lateral edge of the support board, and an elastic bar, which defines an outer rim portion of the opening and which forms a portion of a lateral edge of the support board.

6. The aircraft light according to claim 5,
wherein the elastic bar extends substantially straight along the lateral edge of the support board; or
wherein the elastic bar has a curved configuration or a trapezoidal configuration.

7. The aircraft light according to claim 5, wherein the elastic bar has an engaging protrusion, which extends from the elastic bar in the transverse direction (T), wherein the engaging protrusion extends from a central portion of the elastic bar.

8. The aircraft light according to claim 1, wherein each of the two lateral edges of the support board comprises at least one spring element.

9. The aircraft light according to claim 1,
wherein the support board is a flexible support board, wherein the flexible support board is bendable in the transverse direction (T).

10. The aircraft light according to claim 1,
wherein the supporting profile is an extrusion profile.

11. The aircraft light according to claim 1, wherein the distance in the transverse direction (T) between the two side walls is between 5 mm and 50 mm.

12. The aircraft light according to claim 1, comprising a plurality of support boards, wherein each of the plurality of support boards comprises at least one spring element for elastically fixing the respective support board within the receiving space, and wherein the plurality of support boards are arranged in a row extending along the longitudinal direction (L) of the supporting profile.

13. The aircraft light according to claim 12,
wherein each of the plurality of support boards supports at least one light source; or
wherein the plurality of support boards comprise at least one first support board, which supports at least one electric light source, and at least one second support board supporting electric circuitry, which does not include an electric light source.

14. The aircraft light according to claim 1,
wherein the aircraft light is an interior aircraft light, wherein the aircraft light is at least one of
a lavatory illumination light;
a galley illumination light;
an aisle illumination light, which is configured to be installed along an aisle of a passenger cabin of an aircraft; and <a cabin illumination light, which is configured to be installed along an overhead baggage compartment in a passenger cabin.

15. An aircraft comprising:
at least one aircraft light according to claim 1.

16. The aircraft light according to claim 1, wherein the at least one light source comprises at least one LED.

17. The aircraft light according to claim 1, wherein each of the two lateral edges of the support board comprises a plurality of spring elements.

18. The aircraft light according to claim 1, wherein the support board is a printed circuit board made of a material comprising fiberglass-reinforced epoxy-laminated sheets.

19. The aircraft light according to claim 1, wherein the supporting profile is made of metal, wherein the metal is aluminum or an alloy comprising aluminum, or wherein the supporting profile is made of a plastic material, wherein the plastic material is a material comprising polycarbonate or fiberglass-reinforced epoxy-laminated sheets.

20. The aircraft light according to claim 1, wherein the extension of each undercut section in the transverse direction (T) is between 1 mm and 5 mm.

* * * * *